United States Patent [19]

Maresca

[11] Patent Number: 4,571,419

[45] Date of Patent: Feb. 18, 1986

[54] BLENDS OF NOVEL POLY(ESTER-CARBONATE)S WITH OTHER POLYMERS

[75] Inventor: Louis M. Maresca, Belle Mead, N.J.

[73] Assignee: Union Carbide Corporation, Danbury, Conn.

[21] Appl. No.: 701,009

[22] Filed: Feb. 12, 1985

Related U.S. Application Data

[62] Division of Ser. No. 485,946, Apr. 18, 1983, Pat. No. 4,499,257.

[51] Int. Cl.$^4$ .............................................. C08G 63/64
[52] U.S. Cl. .................................. 525/177; 525/169; 525/436; 525/439; 525/444; 525/448
[58] Field of Search ............... 528/125, 126, 128, 173, 528/174, 151, 153, 154; 525/439, 169, 177, 436, 444, 448

[56] References Cited

U.S. PATENT DOCUMENTS 4,499,257  2/1985  Maresca .............................. 528/173

Primary Examiner—Lester L. Lee
Attorney, Agent, or Firm—Donald M. Papuga

[57] ABSTRACT

This invention is directed to blends of novel poly(ester-carbonate)s containing repeating units derived from bis(3,5-dimethyl-4-hydroxyphenyl) sulfone and up to 80% of another dihydric phenol linked together by carbonate and arylate units and a polymer selected from the group consisting of an aromatic polycarbonate, a polyester, a polysulfone, a polyarylate, a poly(ether-imide), a styrenic polymer and a vinyl chloride containing polymer. The invention is also directed to a process for preparation of this polymer.

8 Claims, No Drawings

BLENDS OF NOVEL POLY(ESTER-CARBONATE)S WITH OTHER POLYMERS

This application is a division of prior U.S. application: Ser. No. 485,946 filed Apr. 18, 1983, now U.S. Pat. No. 4,499,257.

BRIEF SUMMARY OF THE INVENTION

1. Technical Field

The invention relates in general to novel poly(ester-carbonate)s and in particular to novel poly(ester-carbonate)s made by the reaction of a dihydric phenol, preferably, 2,2-bis-(4-hydroxyphenyl)propane (known as bisphenol-A), bis-(3,5-dimethyl-4-hydroxyphenyl)-sulfone, a carbonate precursor, and an aromatic diacid or a derivative thereof.

2. Background of the Invention

U.S. Pat. No. 3,652,499, patented Mar. 28, 1972 to William F. H. Borman, describes linear polyesters having recurring structural units of, for example, bis-(3,5-dimethyl-4-hydroxyphenyl)sulfone and an acid halide of poly-basic acid selected from the group of substituted and of unsubstituted malonic, glutaric and pimelic acids. The polymers are characterized as being extremely resistant to common organic solvents and have substantially the same or better physical properties than the polyesters of the prior art. Characterized in the patent as polyesters of the prior art are the polyesters of U.S. Pat. No. 3,234,167, patented February 1966 to W. Sweeney. That patent describes the recurring structural formula of a polymer which one could characterize as a polymer derived from a bis-phenolic compound and an aromatic dicarboxylic acid such as terephthalic and isophthalic acids. The structural formula for the bis-phenolic compound would include the compound bis-(3,5-dimethyl-4-hydroxyphenyl)sulfone. According to U.S. Pat. No. 3,652,499, the polymers of U.S. Pat. No. 3,234,167 are reported to be soluble in organic solvents. This was construed as a sufficient distinction between the claimed polymers of U.S. Pat. No. 3,652,499 and such a distinction, is apparently predicated upon the use of aliphatic dicarboxylic acids in the manufacture of the polyester.

Poly(ester-carbonates) are very well known in the art and they have been utilized commercially for a number of years. Illustrative of the patent literature in the field of poly(ester-carbonates) are the following:

U.S. Pat. No. 3,169,121, patented Feb. 9, 1965 to Goldberg; U.S. Pat. No. 3,207,814, patented Sept. 21, 1965, to Goldberg; U.S. Pat. No. 3,729,447, patented Apr. 24, 1973, to Haderland, et al.; U.S. Pat. No. 4,130,548, patented Dec. 19, 1978, to Kochanowski; U.S. Pat. No. 4,156,069, patented May 22, 1979, to Prevorsek, et al.; U.S. Pat. No. 4,194,038, patented Mar. 18, 1980, to Baker et al.; U.S. Pat. No. 4,219,635, patented Aug. 26, 1980, to Cooke et al.; U.S. Pat. No. 4,238,596, patented Dec. 9, 1980, to Quinn; U.S. Pat. No. 4,238,597, patented Dec. 9, 1980, to Markezich, et al.; U.S. Pat. No. 4,252,939, patented Feb. 24, 1981, to Mori, et al.; U.S. Pat. No. 4,260,731, patented Apr. 7, 1981 to Mori, et al.

DISCLOSURE OF THE INVENTION

The present invention is directed to novel poly(ester-carbonates) comprising from about 20 weight percent to 100 weight percent of repeating units (I) having the formula

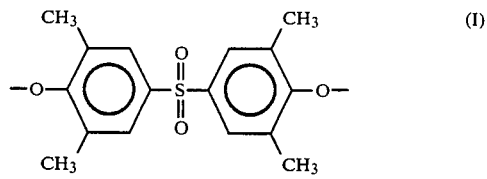

and from 0 weight percent to about 80 weight percent of repeating units (II) having the formula

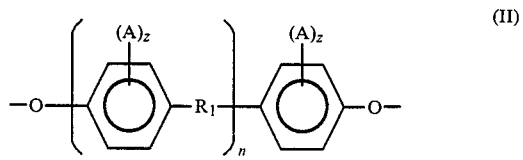

wherein A is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated aliphatic hydrocarbon radical, particularly an alkylene or alkylidene radical having from 1 to 6 carbon atoms, or a cycloalkylidene or cycloalkylene radical having up to and including 9 carbon atoms, O, CO, $SO_2$, S or a direct bond, with the proviso that when $R_1$ is $SO_2$, then repeating unit II is not the same as repeating unit (I). Repeating units (I) and the repeating units (II) are connected by interbonding units, X units of the formula:

and one or more of Y units of the formula:

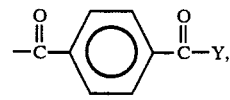

and Z units of the formula:

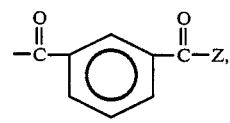

wherein the mole ratio of X units to the combination of one or more Y and Z units is about 0.25 to 9.

Preferably unit (II) is of the following formula:

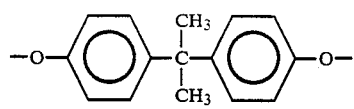

The invention is also concerned with the process for making the poly(ester-carbonate) resin by condensing a mixture of a dihydric phenol and bis-(3,5-dimethyl-4-hydroxyphenyl)sulfone with a carbonate precursor and one or more aromatic diacids in the presence of a condensation catalyst.

The invention also encompasses the aforementioned poly(ester-carbonate) in which there is also included a glycol or an aliphatic dihydroxy compound other than a bisphenol in making the products of this invention.

DETAILED DESCRIPTION

The poly(ester-carbonate)s of this invention are better termed the polyarylate polycarbonates. They are characterized by the repeating of bis(3,5-dimethyl-4-hydroxyphenyl)sulfone units and preferably repeating 2,2-bis-(4-hydroxyphenyl)propane units as well as the repeating carbonate units and arylate units. This highly aromatized polymer possesses superior hydrolytic stability, solvent resistance and flammability properties, an improved melt stability over the conventional polyarylate and polycarbonate and possesses a higher heat distortion temperature than the conventional poly(ester-carbonate)s. In addition, these polymers show superior compatibility with other polymers.

Suitable dihydric phenols which give repeating units (II) include the following:
2,2-bis(4-hydroxyphenyl)propane,
bis-(2-hydroxyphenyl)methane,
bis(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-methyl-4-4hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)propane,
4,4'-(dihydroxyphenyl)ether,
4,4'-dihydroxyphenyl)sulfide,
4,4'-(dihydroxyphenyl)sulfoxide,
hydroquinone, and
naphthalene diols.

The aromatic diacid which can be used herein includes terephthalic acid, isophthalic acid, orthophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. A variety of other aromatic dicarboxylic acids is useful. These include 4,4'-biphenyl dicarboxylic acid, 4,4'-diphenyloxide dicarboxylic acid, their substituted derivative, etc. Moreover, hydroxyaromatic acids, i.e., 4-hydroxybenzoic acid and the like, are useful. Preferably, mixtures of isophthalic and terephthalic acids are used. Derivatives of these acids may also be used.

The poly(ester-carbonate) of this invention can be prepared by well known processes such as by interfacial polymerization or phase boundary separation, solution polymerization, transesterification, and the like. These processes typically include dissolving the reactants in a suitable solvent medium under controlled pH conditions and in the presence of a suitable catalyst and acid acceptor and then contacting these reactants with a carbonate precursor. A molecular weight regulator; i.e., chainstopper, is generally added to the reactants prior to contacting them with a carbonate precursor.

The acid acceptor employed can be either an organic or an inorganic acid acceptor. A suitable organic acid acceptor is pyridine or a tertiary amine which includes such materials as triethylamine, dimethylaniline, tributylamine, etc. The inorganic acid acceptor can be one which can be either a hydroxide, a carbonate, a bicarbonate, or a phosphate of an alkali or alkaline earth metal.

The carbonate precursor employed can be either a carbonyl halide, a carbonate ester or a haloformate. The carbonyl halides which can be employed are carbonyl bromide, carbonyl chloride and mixtures thereof. Typical of the carbonate esters that can be employed are diphenyl carbonate, di-(halophenyl)carbonates such as di-(chlorophenyl)carbonate, di-(bromophenyl)carbonate, di-(trichlorophenyl)carbonate, di-(tribromophenyl)carbonate, etc., di(alkylphenyl)carbonate such as di(tolyl)carbonate, etc., di(naphthyl)carbonate, di-(chloronaphthyl)carbonate, phenyl tolyl carbonate, chlorophenyl chloronaphthyl carbonate, etc., or mixtures thereof. The haloformates suitable for use herein include bis-haloformates or dihydric phenols (bischloro-formates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The catalysts which can be employed can be any of the suitable catalysts that aid the polymerization of the bisphenol-A with phosgene. Suitable catalysts include tertiary amines such as triethylamine, tripropylamine, N,N-dimethylaniline, quarternary ammonium compounds such as tetraethylammonium bromide, cetyl triethylammonium bromide, tetra-n-heptylammonium iodide, tetra-n-propylammonium bromide, tetramethylammonium chloride, and quaternary phosphonium compounds such as n-butyl-triphenyl phosphonium bromide and methyltriphenyl phosphonium bromide.

The solvent system employed is one in which the reactants can be accepted but which is inert with respect to the reactants. For example, an aqueous organic solvent system can be employed wherein the organic member can readily accept the reactants, but be inert to them. Exemplary of such organic members are methylene chloride, chlorobenzene, cyclohexanone, carbon tetrachloride, and the like. Preferably, the organic portion of the solvent system is methylene chloride.

The molecular weight regulators or chainstoppers that can be employed in the reaction include monohydric phenols, primary and secondary amines, etc. Other preferred chainstoppers include p-cumylphenol, p-tritylphenol and p-phenylphenol.

Additionally, the preparation of the poly(ester-carbonate) may be carried out in the presence of from about 10 to about 60 weight percent, based on the weight of the poly(ester-carbonate) produced, of a processing aid.

The preferred processing aids are diphenyl ether compounds, a cycloaliphatic, substituted aromatic, or heteroaromatic compound, and a halogenated and/or etherated substituted aromatic or heteroaromatic compound, or mixtures of these.

The poly(ester-carbonate) resins of this invention are characterized as thermoplastic structures which have a relatively high molecular weight, that is, a reduced viscosity determined at 25° C. in chloroform of at least 0.3 dl/g, preferably at least 0.5 dl/g and, typically not exceeding about 1.5 dl/g. These polymers are exceptionally tough, possess superior flammability properties, have improved melt stability and offer higher heat distortions than the conventional poly(ester-carbonate)s of the prior art. The advantages of the polymers of this invention occur as a result of the repeating bis-(3,5-dimethyl-4-oxyphenyl)sulfone moieties in the polymer backbone in the amounts as herein set forth. In addition, the poly(ester-carbonate)s of this invention exhibit excellent compatability with the polyethersulfones such as those which are described in U.S. Pat. No. 3,264,536 and U.S. Pat. No. 4,175,175, as well as with other poly(aryl ether)s, aromatic polycarbonates, polyesters, polyarylates, poly(ether imide)s, styrenic polymers, vinyl chloride containing polymers, and the like.

The structure of the polymers of this invention can be modified to some extent by including in the polymerization reaction other dihydroxy compounds, typically not more than 10 weight percent of the total weight of the repeating units (I) and (II) in the poly(ester-carbonate). For example, one might include along with Bisphenol-A and bis-(3,5-dimethyl-4-hydroxyphenyl)sulfone, other dihydroxy compounds either as such or in the haloformate form, as a partial substitute and modifier of the polymeric structure, without adversely affecting the overall properties of the polymeric structure of this invention. For example, such dihydroxy compounds as ethylene glycol, propylene glycol, 1,4-butylene glycol, and the like can be included in the polymerization reactions to manufacture the polymers of this invention.

EXAMPLES

Example 1

A solution of 10.15 grams (0.05 moles) of isophthaloyl chloride and 10.15 grams (0.05 moles) of terephthaloyl chloride in 50 milliliters of methylene chloride is added dropwise to a stirred solution of 22.80 grams (0.10 moles) of 2,2-bis-(4-hydroxyphenyl) propane (known a bisphenol A) and 30.60 grams (0.10 moles) of bis-(3,5-dimethyl-4-hydroxyphenyl)sulfone (known as tetramethylbisphenol S, TMBS) in 450 ml of methylene chloride and 100 milliliters of pyridine. Room temperature is maintained throughout the addition. After stirring the reaction for 1 hour, phosgene is bubbled into the mixture at a rate of 0.5 grams per minute for 30 minutes at room temperature and atmospheric pressure. The reaction mixture is diluted with 500 milliliters of methylene chloride and then washed sequentially with water, 5% HCl and water. The polymer is isolated by coagulation in methanol and filtered and then dried in a vacuum oven at 60° C.

Example 2

To a 3 liter flask is added 91.20 grams (0.4 moles) of bisphenol A, 183.60 grams (0.60 moles of) TMBS, 900 milliliters of methylene chloride, 700 milliliters of water and 4 ml of the ethylamine. The pH of the mixture is adjusted to 9-10 by the addition of 35% aqueous caustic. A solution of 50.75 grams (0.25 moles) of isophthaloyl chloride and 50.75 grams (0.25 moles) of teryphthaloyl chloride in 250 milliliters of methylene chloride is added over a period of 15 minutes. The pH is lowered to 5-6 by the introduction of phosgene and additional phosgene is delivered at 0.5 grams per minute for 10 minutes. The pH is adjusted to 11 and phosgenation continued at 5 grams per minute for 20 minutes while maintaining the pH at 11 with 35% aqueous caustic. The organic layer is diluted with 1000 milliliters of methylene chloride and then washed sequentially with water, 5% HCl, and water. The polymer is isolated by coagulation in methanol and filtered and is dried in a vacuum oven at 60° C.

I claim:

1. A blend containing a polymer selected from the group consisting of an aromatic polycarbonate, a polyester, a polysulfone, a polyarylate, a poly(ether imide), a styrenic polymer or a vinyl chloride containing polymer and a poly(ester-carbonate) resin, said poly(ester-carbonate) consisting essentially of from about 20 weight percent to 100 weight percent of repeating units (I) having the formula

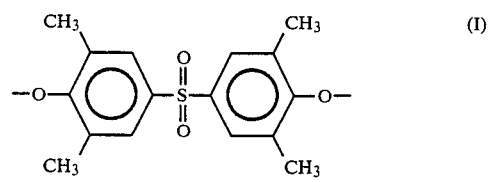

and from 0 weight percent to about 80 weight percent of repeating units (II) having the formula

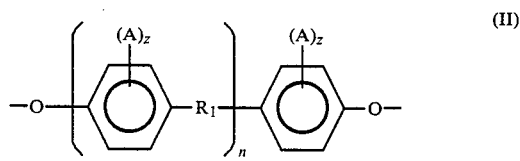

wherein A is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated aliphatic hydrocarbon radical, or a cycloalkylidene or cycloalkylene radical having up to and including 9 carbon atoms, O, CO, $SO_2$, S or a direct bond, with the proviso that when $R_1$ is $SO_2$, then repeating unit (II) is not the same as repeating unit (I); the repeating units (I) and the repeating units (II) are connected by interbonding units, X units of the formula:

and one or more of Y units of the formula:

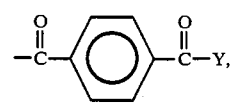

and Z units of the formula:

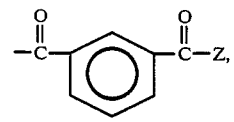

wherein the mole ratio of X units to the combination of one or more Y and Z units is about 0.25 to 9.

2. A poly(ester-carbonate) blend as defined in claim 1 which contains an aromatic polycarbonate.

3. A poly(ester-carbonate) blend as defined in claim 1 which contains a polyester.

4. A poly(ester-carbonate) blend as defined in claim 1 which contains a polysulfonate.

5. A poly(ester-carbonate) blend as defined in claim 1 which contains a polyarylate.

6. A poly(ester-carbonate) blend as defined in claim 1 which contains a poly(ether imide).

7. A poly(ester-carbonate) blend as defined in claim 1 which contains a styrenic polymer.

8. A poly(ester-carbonate) blend as defined in claim 1 which contains a vinyl chloride containing polymer.

* * * * *